United States Patent
Kiwaki et al.

(10) Patent No.: US 8,210,221 B2
(45) Date of Patent: Jul. 3, 2012

(54) PNEUMATIC TIRE WITH TREAD HAVING INSIDE AND OUTSIDE CIRCUMFERENTIAL SIPES

(75) Inventors: Yukihiro Kiwaki, Higashimurayama (JP); Ryoichi Watabe, Tokyo (JP)

(73) Assignee: Bridgestone Corporation, Tokyo (JP)

( * ) Notice: Subject to any disclaimer, the term of this patent is extended or adjusted under 35 U.S.C. 154(b) by 831 days.

(21) Appl. No.: 12/279,961

(22) PCT Filed: Feb. 20, 2007

(86) PCT No.: PCT/JP2007/053054
§ 371 (c)(1),
(2), (4) Date: Dec. 23, 2008

(87) PCT Pub. No.: WO2007/097309
PCT Pub. Date: Aug. 30, 2007

(65) Prior Publication Data
US 2010/0224297 A1    Sep. 9, 2010

(30) Foreign Application Priority Data

Feb. 20, 2006    (JP) .................................. 2006-042855
Feb. 20, 2006    (JP) .................................. 2006-042857

(51) Int. Cl.
*B60C 11/12*    (2006.01)
(52) U.S. Cl. ........... 152/209.8; 152/209.21; 152/209.23; 152/209.27; 152/DIG. 3; 152/902
(58) Field of Classification Search ............. 152/209.18, 152/209.21, 209.23, 209.27, DIG. 3, 902, 152/209.8, 209.9
See application file for complete search history.

(56) References Cited

U.S. PATENT DOCUMENTS

| 2002/0139164 A1* | 10/2002 | Ishihara ................... 152/DIG. 3 |
| 2004/0134579 A1 | 7/2004 | Tanaka |

FOREIGN PATENT DOCUMENTS

| DE | 102 14 913 A1 | 10/2002 |
| DE | 103 60 432 A1 | 7/2004 |
| EP | 0 952 011 A2 | 10/1999 |
| EP | 1 277 599 A2 | 1/2003 |
| EP | 1 552 967 A2 | 7/2005 |
| JP | 02-267006 A | 10/1990 |
| JP | 06-127217 A * | 5/1994 |
| JP | 08-244417 A | 9/1996 |
| JP | 2000-6619 A | 1/2000 |
| JP | 2000-190711 | 7/2000 |

(Continued)

OTHER PUBLICATIONS

Machine translation for Japan 06-127217 (no date).*

(Continued)

*Primary Examiner* — Steven D Maki
(74) *Attorney, Agent, or Firm* — Sughrue Mion, PLLC

(57) ABSTRACT

A pneumatic tire according to the present invention includes blocks on its tread which are segmented by plural circumferential grooves 3 extending along a tire circumferential direction and plural lateral grooves 5 extending along a tread width direction. Circumferential sipes extending along the tire circumferential direction are provided in the blocks. Inside circumferential sipes extend straight along a tire radial direction and outside circumferential sipes extend along the tire radial direction in zigzag patterns. According to the present invention, a handling performance, especially, a cornering performance can be improved regardless of road surface conditions.

9 Claims, 5 Drawing Sheets

FOREIGN PATENT DOCUMENTS

| | | | |
|---|---|---|---|
| JP | 2002-187412 A | * | 7/2002 |
| JP | 2002-254906 A | | 9/2002 |
| JP | 2003-025812 A | | 1/2003 |
| JP | 2004-026158 A | | 1/2004 |
| JP | 2005-126055 A | | 5/2005 |
| JP | 2005-162058 A | | 6/2005 |
| JP | 2007-045316 A | * | 2/2007 |
| WO | 2005/030502 A1 | | 4/2005 |

OTHER PUBLICATIONS

Machine translation for Japan 2007-045316 (no date).*
Machine translation for Japan 2002-187412 (no date).*
Supplementary European Search Report dated Sep. 23, 2009.

* cited by examiner (a)

(b)

(a)

(b)

PNEUMATIC TIRE WITH TREAD HAVING INSIDE AND OUTSIDE CIRCUMFERENTIAL SIPES

TECHNICAL FIELD

The present inventions relate to a pneumatic tire having blocks on its tread which are segmented by plural circumferential grooves and plural lateral grooves.

BACKGROUND ART

Heretofore, various proposals have been made with respect to a pneumatic tire for improving a handling performance on snow or ice covered roads by increasing a gripping force (i.e. an edge effect). For example, in a Patent Document listed below, disclosed is a pneumatic tire in which lateral sipes extending along a tread width direction are provided on blocks segmented by circumferential grooves and lateral grooves.

In this pneumatic tire, the edge effect can be exerted sufficiently at starting and braking, and thereby a handling performance (especially, a startup accelerating performance and a braking performance) is made improved. However, according to this pneumatic tire, friction between its tread and a road surface becomes small while cornering, and thereby sideslips may occur. In recent pneumatic tires, circumferential sipes extending along a tire circumferential direction are provided on its blocks to restrain such sideslips. In a Patent Document 2 listed below, disclosed is a pneumatic tire in which circumferential sipes extending along a tire circumferential direction and extending straight along a tire radial direction are provided in its blocks.

Patent Document 1: Japanese Patent Application Laid-Open NO. 2000-190711 (pages 2 to 4, FIG. 1)

Patent Document 2: Japanese Patent Application Laid-Open NO. 2002-254906 (pages 2 and 3, FIG. 1)

DISCLOSURE OF THE INVENTION

However, according to a conventional pneumatic tire with circumferential sipes formed in its blocks in addition to lateral sipes, large loads apply to inside blocks under being equipped onto a vehicle at starting and braking, and thereby stiffness of the inside blocks cannot be ensured. In addition, large loads apply to outside blocks while high-speed cornering and while cornering in tight corners, and thereby stiffness of the outside blocks cannot be ensured. Thus, the edge effect cannot be exerted sufficiently due to large deformations of the inside or outside blocks, and thereby a handling performance (especially, a startup accelerating performance, a braking performance and a cornering performance) on dry roads and snow or ice covered roads is decreased.

Therefore, it is an object of the present inventions to provide a pneumatic tire that can improve a handling performance, especially, a startup accelerating performance, a braking performance and a cornering performance.

A pneumatic tire according to the present invention includes a tread having blocks segmented by plural circumferential grooves extending along a tire circumferential direction and plural lateral grooves extending along a tread width direction. Note that "blocks" mentioned here shall include blocks continuously extending along an entire circumference of the tire (they may be called ribs). And each of the blocks has a circumferential sipes extending along the tire circumferential direction. Among the circumferential sipes, inside circumferential sipes, which are positioned inside a tire equatorial plane under being equipped onto a vehicle, extend straight along a tire radial direction. Among the circumferential sipes, outside circumferential sipes, which are positioned outside the tire equatorial plane under being equipped onto a vehicle, extend along the tire radial direction in zigzag patterns.

In this manner, since the outside circumferential sipes extend along the tire radial direction in zigzag patterns, zigzag patterns along the tire radial direction in the outside circumferential sipes are engaged each other and thereby strength against lateral forces while cornering is increased. As a result, stiffness reduction of the outside blocks can be restrained. Since deformations of the outside blocks can be restrained and then the edge effect can be improved, a handling performance, especially, a cornering performance can be improved regardless of road surface conditions such as dry roads, wet roads or snow/ice covered roads.

Here, it is preferable that the circumferential sipes extend along the tire circumferential direction in zigzag patterns. According to this configuration, since the circumferential sipes extend along the tire circumferential direction in zigzag patterns, strength against forward and backward forces at starting and braking can be increased and then the edge effect can be improved. As a result, a handling performance, especially, a startup accelerating performance and a braking performance can be improved.

Here, it is preferable that lateral sipes extending along the tread width direction are provided in the blocks. According to this configuration, since the lateral sipes are provided in the blocks, the edge effect can be improved at starting and braking. As a result, a handling performance, especially, a startup accelerating performance and a braking performance can be improved.

Here, it is preferable that, among the lateral sipes, inside lateral sipes, which are positioned inside the tire equatorial plane under being equipped onto a vehicle, extend along the tire radial direction in zigzag patterns, and outside lateral sipes, which are positioned outside the tire equatorial plane under being equipped onto a vehicle, extend straight along the tire radial direction. According to this configuration, since the inside lateral sipes extend along the tire radial direction in zigzag patterns, zigzags along the tire radial direction in the inside lateral sipes are engaged each other and thereby strength against loads at starting and braking is increased. As a result, stiffness reduction of the inside blocks can be restrained. Since, deformations of the inside blocks can be restrained and then the edge effect can be improved, a handling performance, especially, a startup accelerating performance and a braking performance can be improved regardless of road surface conditions such as dry roads, wet roads or snow/ice covered roads.

Here, it is preferable that the lateral sipes extend along the tread width direction in zigzag patterns. According to this configuration, since the lateral sipes extend along the tread width direction in zigzag patterns, strength against cornering lateral forces can be increased and then the edge effect can be improved. As a result, a handling performance, especially, a cornering performance can be improved.

Here, it is preferable that depths of the inside and outside circumferential sipes are almost equal. Here, difference between the depths of the inside and outside circumferential sipes shall be equal-to or smaller-than 1 mm. In addition, it is preferable that depths of the inside and outside lateral sipes are almost equal. Here, difference between the depths of the inside and outside lateral sipes shall be equal-to or smaller-than 1 mm.

Here, it is preferable that the number of zigzag of each circumferential sipe is fewer than the number of zigzag of each lateral sipe.

Here, it is preferable that the pneumatic tire according to the present invention equipped onto a passenger car. Here, a passenger car shall mean a car in which ten people (incl. a driver) can be get, for example, an ordinary-sized vehicle, a small-sized vehicle, a light vehicle and so on.

BEST MODE(S) FOR CARRYING OUT THE INVENTION

One embodiment of a pneumatic tire according to the present invention will be explained with reference to diagrams. Note that, in respect to descriptions on the drawings, each equivalent or corresponding configuration is allocated to an equivalent or corresponding numeral. However, the drawings are shown in outline, and thereby each actual proportion of dimension or the like may be different from an actual one. Therefore, each concrete dimension or the like should be determined with considering explanations below. In addition, each relation or proportion of dimension may be different between the drawings.

Note that the pneumatic tire 1 according to the present embodiment is a commonly-used radial tire (winter tire) including beads, a carcass layer(s) and a belt layer(s) [not shown]. And the pneumatic tire 1 according to the present embodiment is equipped onto a passenger car.

Figure 1:
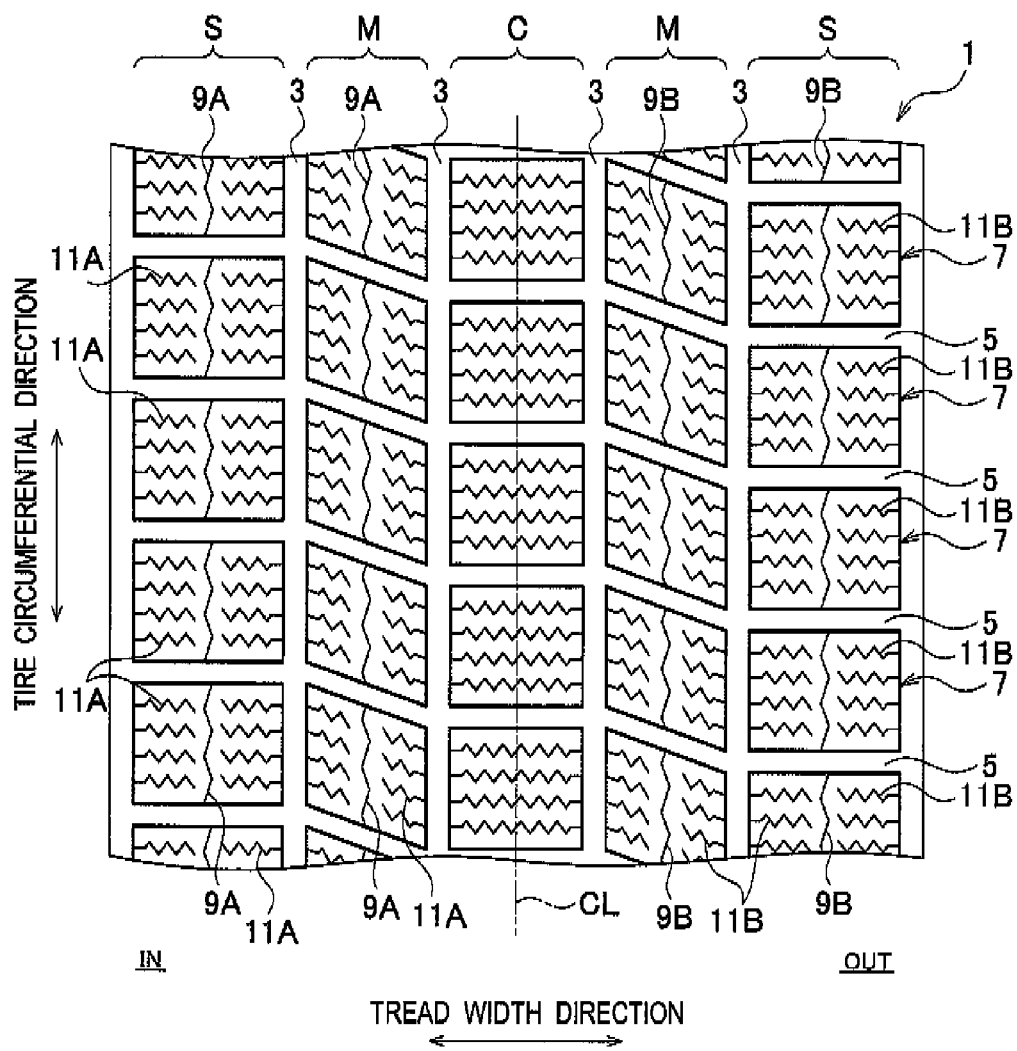
FIG. 1 is a development view showing a tread pattern of a pneumatic tire according to a present embodiment.

As shown in FIG. 1, a tread of the pneumatic tire 1 has blocks 7 segmented by plural circumferential grooves 3 extending along a tire circumferential direction and plural lateral grooves 5 extending along a tread width direction. Circumferential sipes 9 extending along the tire circumferential direction and lateral sipes 11 extending along the tread width direction are formed in the blocks 7.

The circumferential sipes 9 are composed of inside circumferential sipes 9A located inside IN a tire equatorial plane CL under being equipped onto a vehicle and outside circumferential sipes 9B located outside OUT. In other words, the inside circumferential sipes 9A are provided in the blocks 7 located inside IN the tire equatorial plane CL under being equipped onto a vehicle (hereinafter, referred as the inside blocks). On the other hand, the outside circumferential sipes 9B are provided in the blocks 7 located outside OUT the tire equatorial plane CL under being equipped onto a vehicle (hereinafter, referred as the outside blocks).

The lateral sipes 11 are composed of inside lateral sipes 11A located inside IN the tire equatorial plane CL under being equipped onto a vehicle and outside lateral sipes 11B located outside OUT. In other words, the inside lateral sipes 11A are provided on the inside blocks 7. On the other hand, the outside lateral sipes 11B are provided on the outside blocks 7.

Figure 2:
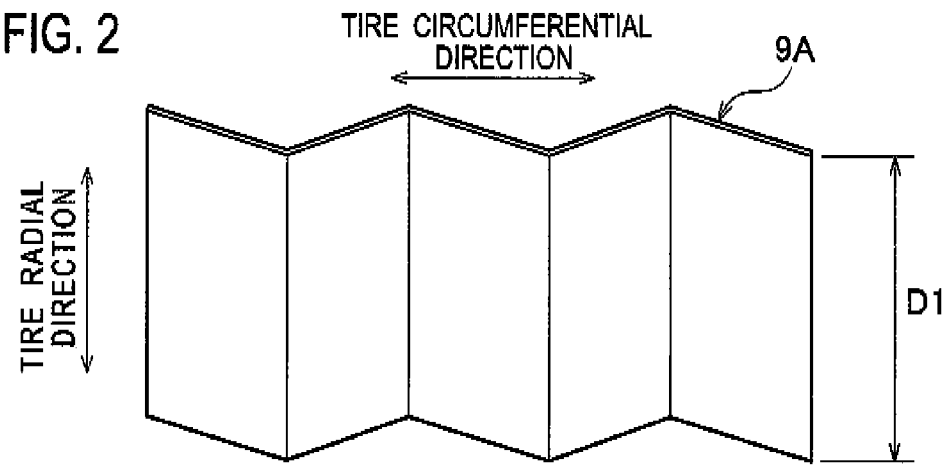
FIG. 2 is a perspective view showing only an inside circumferential sipe provided on an inside block of the pneumatic tire according to the present embodiment.

As shown in FIG. 2, the inside circumferential sipes 9A extend along the tire circumferential direction in repeated zigzag patterns. The inside circumferential sipes 9A extend straight along the tire radial direction.

Figure 3:
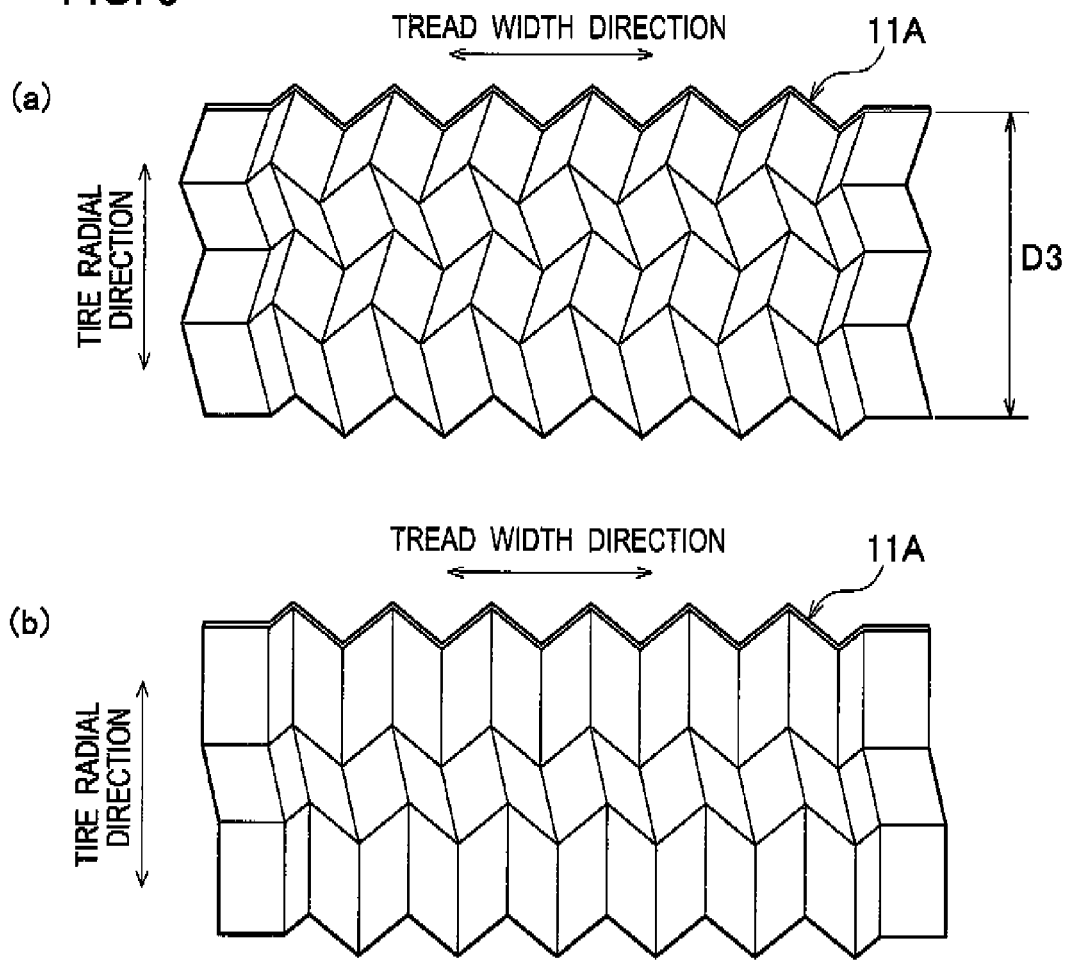
FIG. 3 is a perspective view showing only an inside lateral sipe provided on the inside block of the pneumatic tire according to the present embodiment.

As shown in FIG. 3(a), the inside lateral sipes 11A extend along the tread width direction in repeated zigzag patterns. The inside lateral sipes 11A extend along the tire radial direction in repeated zigzag patterns. Note that the inside lateral sipes 11A are not limited to lateral sipes extending in repeated zigzag patterns three times in the tire radial direction and may be obviously lateral sipes extending in repeated zigzag patterns two times in the tire radial direction as shown in FIG. 3(b).

Figure 4:
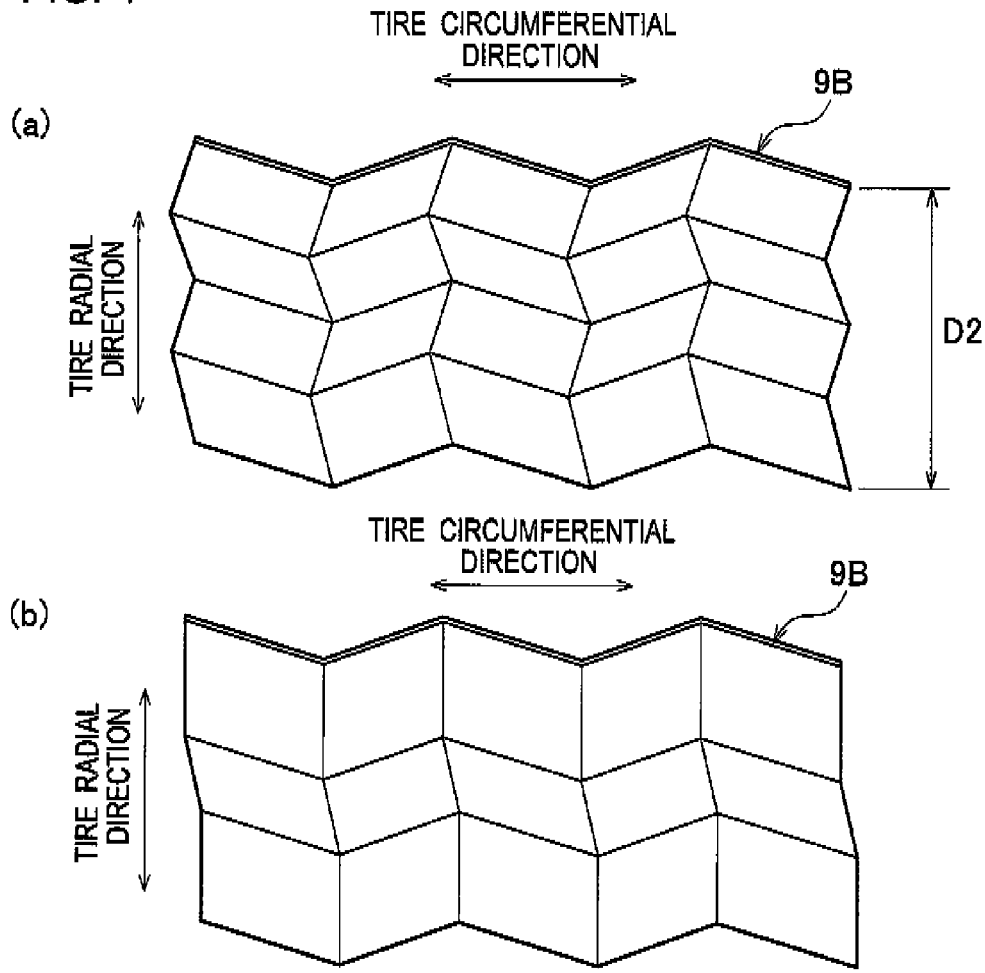
FIG. 4 is a perspective view showing only an outside circumferential sipe provided on an outside block of the pneumatic tire according to the present embodiment.

As shown in FIG. 4(a), the outside circumferential sipes 9B extend along the tire circumferential direction in repeated zigzag patterns. The outside circumferential sipes 9B extend along the tire radial direction in repeated zigzag patterns. Note that the outside circumferential sipes 9B are not limited to circumferential sipes extending with repeated bends three times in the tire radial direction and may be obviously circumferential sipes extending with repeated bends two times in the tire radial direction as shown in FIG. 4(b).

Figure 5:
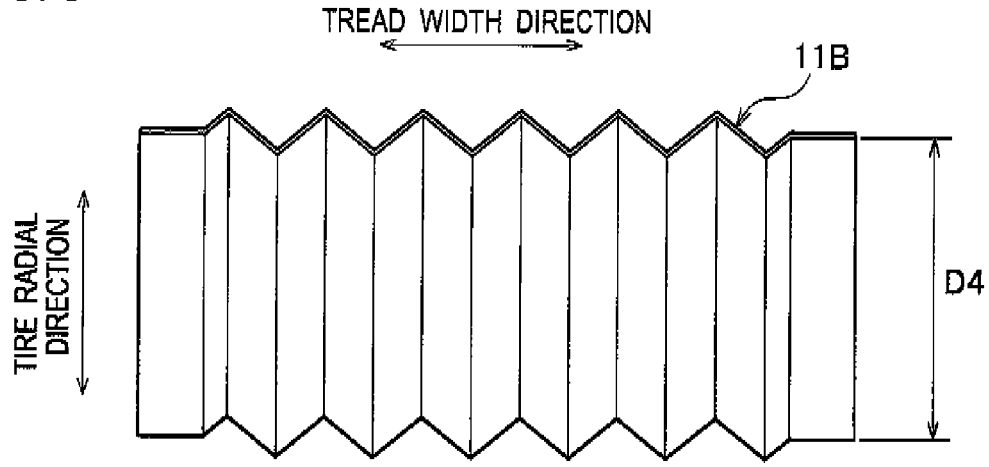
FIG. 5 is a perspective view showing only an outside lateral sipe provided on the outside block of the pneumatic tire according to the present embodiment.

As shown in FIG. 5, the outside lateral sipes 11B extend along the tread width direction in zigzag patterns. The outside lateral sipes 11B extend straight along the tire radial direction.

It is preferable that the number of circumferential bends of each circumferential ripe 9 on the tread, mentioned above, is made fewer than the number of lateral bends of each lateral sipe 11 in order to restrain stiffness reduction of the blocks 7 (the inside and outside blocks).

In addition, it is preferable that a depth D1 of each inside circumferential sipe 9A is made almost equal to a depth D2 of each outside circumferential sipe 9B in order to ensure absorbability and drainability of water, snow or the like at a contact plane (between the tread and a road surface). Furthermore, it is preferable that a depth D3 of each inside lateral sipe 11A is made almost equal to a depth D4 of each outside lateral sipe 11B.

Modified Example 1

The circumferential sipes 9 (the inside circumferential sipes 9A and the outside circumferential sipes 9B) in the above-described embodiment extend along the tire circumferential direction in zigzag patterns. However, the circumferential sipes can be modified as described below. Note that different points from the pneumatic tire 1 in the above-described embodiment will be mainly explained hereinafter.

Figure 6:
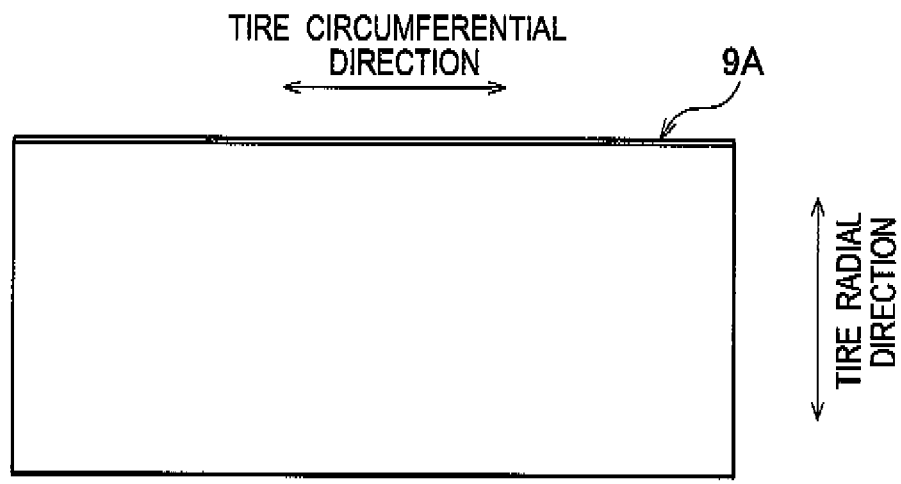
FIG. 6 are perspective views showing only inside and outside circumferential sipes provided on inside and outside block of a pneumatic tire of a modified example 1.
Figure 6:
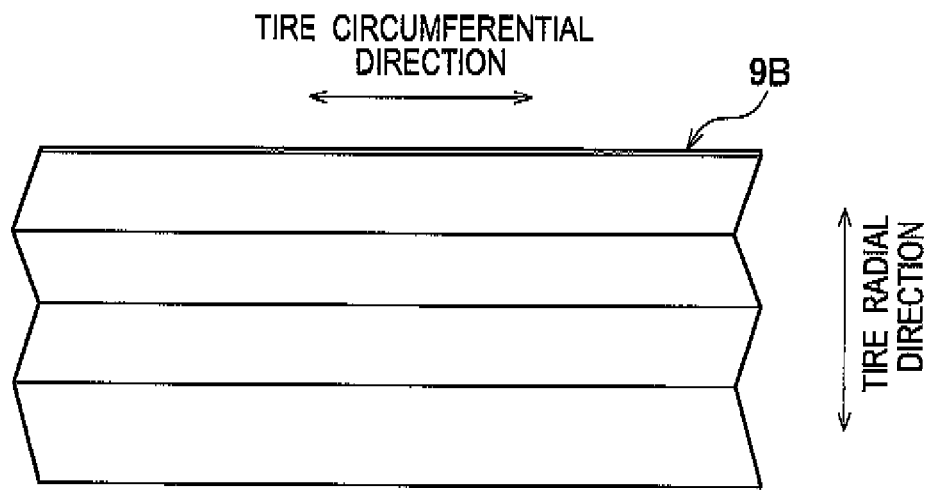

As shown in FIG. 6(a), the inside circumferential sipes 9A extend straight along the tire circumferential direction. Also in this case, the inside circumferential sipes 9A extend straight along the tire radial direction.

In addition, as shown in FIG. 6(b), the outside circumferential sipes 9B extend straight along the tire circumferential direction. Also in this case, the outside circumferential sipes 9B extend along the tire radial direction in zigzag patterns.

Modified Example 2

In addition, the present invention goes beyond the above modified embodiment. The lateral sipes 11 (the inside lateral sipes 11A and the outside lateral sipes 11B) in the above-described embodiment extend along the tire width direction in zigzag patterns. However, the lateral sipes can be modified as described below.

Figure 7:
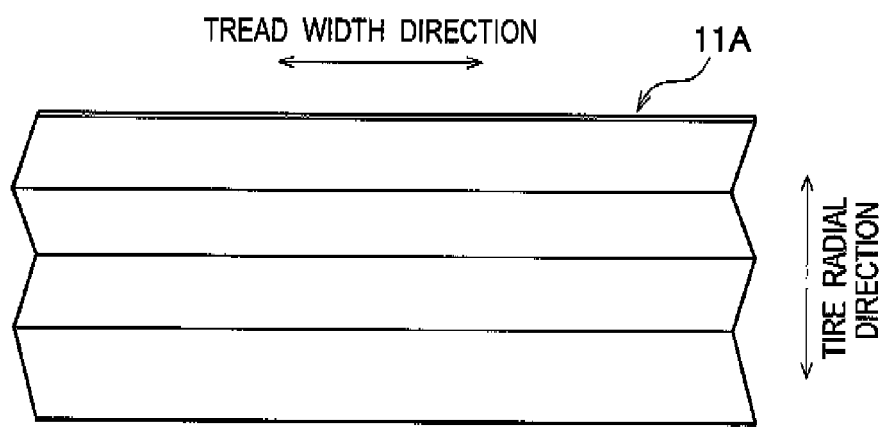
FIG. 7 are perspective views showing only inside and outside lateral sipes provided on inside and outside block of a pneumatic tire of a modified example 2.
Figure 7:
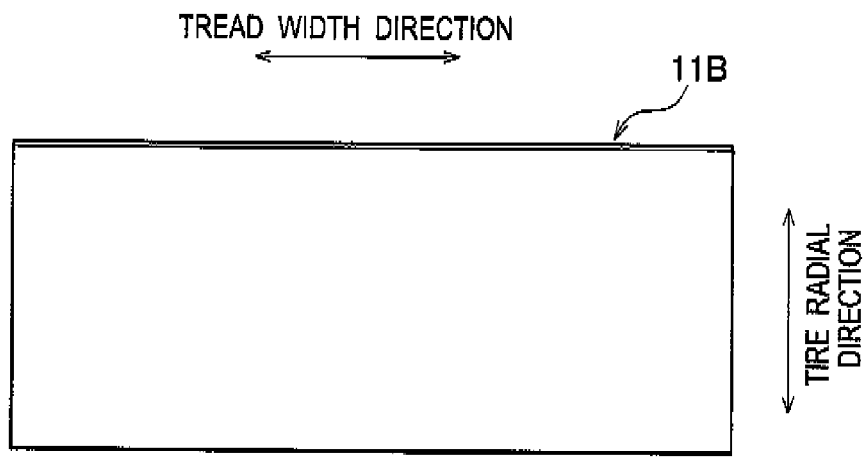

As shown in FIG. 7(a), the inside lateral sipes 11A extend straight along the tread width direction. Also in this case, the inside lateral sipes 11A extend along the tire radial direction in zigzag patterns.

In addition, as shown in FIG. 7(b), the outside lateral sipes 11B extend straight along the tread width direction. Also in this case, the outside lateral sipes 11B extend straight along the tire radial direction.

Modified Example 3

In addition, the present invention goes beyond the above modified embodiments and can be modified as described below.

In the above-described embodiment, all the inside lateral sipes 11A extend along the tire radial direction in zigzag patterns. However, the inside lateral sipes are not limited to this configuration. At least some of the inside lateral sipes 11A may extend along the tire radial direction in zigzag patterns.

For example, as shown in FIG. 1, only the inside lateral sipes 11A in the blocks 7 located in tread shoulder areas S may extend along the tire radial direction in zigzag patterns. In addition, only the inside lateral sipes 11A in the blocks 7 located in tread middle areas M between a tread center area C and the tread shoulder areas S may extend along the tire radial direction in zigzag patterns.

In addition, in the above-described embodiment, all the outside circumferential sipes 9B extend along the tire radial direction in zigzag patterns. However, the outside circumferential sipes are not limited to this configuration. At least some of the outside circumferential sipes 9B may extend along the tire radial direction in zigzag patterns.

For example, as shown in FIG. 1, only the outside circumferential sipes 9B in the blocks 7 located in the tread shoulder areas S may extend along the tire radial direction in zigzag patterns. In addition, only the outside circumferential sipes 9B in the blocks 7 located in the tread middle areas M may extend along the tire radial direction in zigzag patterns.

As explained above, although contents of the present invention have been disclosed through the embodiments of the present invention, it should not be considered that descriptions and the drawings composing a portion of the disclosure limits the present invention.

Concretely speaking, the pneumatic tire 1 according to the above-described embodiment is a common-used radial tire including beads, a carcass layer(s) and a belt layer(s) [not shown]. However, the pneumatic tire according to the present invention is not limited to this and may be a tire other than a radial tire (for example, a bias tire).

In addition, the pneumatic tire 1 according to the above-described embodiment is equipped onto a passenger car. However, the pneumatic tire according to the present invention is not limited to this and may be equipped onto a vehicle other than a passenger car (for example, a bus or a truck).

Furthermore, in the above-described embodiment, the circumferential sipes 9 (the inside circumferential sipes 9A and the outside circumferential sipes 9B) are provided on each of the blocks 7 one by one. However, the circumferential sipes are not limited to this configuration and may be provided on each of the blocks 7 in a plurality (for example, two).

Based on the disclosure, various alternative embodiments, modes of the invention and operable technologies may be obvious to the person having ordinary skill in the art. Therefore, a technical scope of the present invention is defined only by a subject matter sought to be patented in claims appropriately derived from the above explanation.

According to the above described pneumatic tire 1 in the present embodiment, stiffness reduction of the inside and outside blocks can be restrained, and thereby a handling performance, especially, a startup accelerating performance, a braking performance and a cornering performance can be improved.

Concretely speaking, since the inside circumferential sipes 9A extend straight along the tire radial direction and the inside lateral sipes 11A extend along the tire radial direction in repeated zigzag patterns, zigzags along the tire radial direction in the inside lateral sipes 11A are supported each other (so as to be engaged each other) to increase strength against loads at starting and braking and thereby stiffness reduction of the inside blocks can be restrained.

In addition, since the outside circumferential sipes 9B extend along the tire radial direction in repeated zigzag patterns and the outside lateral sipes 11B extend straight along the tire radial direction, zigzags along the tire radial direction in the outside circumferential sipes 9B are supported each other (so as to be engaged each other) to increase strength against lateral forces while cornering and thereby stiffness reduction of the outside blocks can be restrained.

Therefore, since deformations of the inside and outside blocks can be restrained to increase the edge effect, a handling performance, especially, a startup accelerating performance, a braking performance and a cornering performance can be improved regardless of road surface conditions such as dry roads, wet roads or snow/ice covered roads.

In addition, since the inside circumferential sipes 9A and the outside circumferential sipes 9B extend along the tire circumferential direction in repeated zigzag patterns, strength against lateral forces while cornering can be made increased to increase the edge effect and thereby a cornering performance can be further improved.

Furthermore, since the inside lateral sipes 11A and the outside lateral sipes 11B extend along the tread width direction in repeated zigzag patterns, strength against loads at starting and braking can be made increased to increase the edge effect and thereby a startup accelerating performance and a braking performance can be further improved.

Next, a test was conducted with pneumatic tires of an embodiment and comparative samples 1 and 2 shown below to demonstrate advantages of the present invention. Note that the present invention does not suffer any limitations by these samples.

Data of each pneumatic tire are measured under condition shown below.
Tire Size: 195/65R15 (56 pitch)
Wheel Size: 15×6JJ
Inner Pressure Condition: 200 kPa
Load Condition: one driver+60 kg
Test Vehicle: FR car (2,500 cc displacement)
Sipe patterns of the pneumatic tires of the embodiment and the comparative samples 1 and 2 are shown in upper areas on Table 1.

TABLE 1

| Patterns along Tire Radial Dir. | | Embodiment | Comp. Sample 1 | Comp. Sample 2 |
|---|---|---|---|---|
| Inside Circumferential Sipes | | Straight | Straight | Zigzag |
| Inside Lateral Sipes | | Zigzag | Straight | Zigzag |
| Outside Circumferential Sipes | | Zigzag | Straight | Zigzag |
| Outside Lateral Sipes | | Straight | Straight | Zigzag |
| Snow Covered Road | Cornering Perform. | 6.0 | 5.0 | 4.0 |
| | Braking Perform. | 103 | 100 | 97 |
| | Startup Accel. Perform. | 103 | 100 | 98 |
| Ice Covered Road | Cornering Perform. | 6.0 | 5.0 | 5.5 |
| | Braking Perform. | 103 | 100 | 103 |
| | Startup Accel. Perform. | 104 | 100 | 104 |

As shown in Table 1, in the pneumatic tire according to the embodiment, the inside circumferential sipes and the outside lateral sipes extend straight along the tire radial direction and the inside lateral sipes and the outside circumferential sipes extend along the tire radial direction in zigzag patterns.

In the pneumatic tire according to the comparative sample 1, the inside circumferential sipes, the inside lateral sipes, the outside circumferential sipes and the outside lateral sipes extend straight along the tire radial direction.

In the pneumatic tire according to the comparative sample 2, the inside circumferential sipes, the inside lateral sipes, the outside circumferential sipes and the outside lateral sipes extend along the tire radial direction in zigzag patterns.

Note that configurations except patterns of the circumferential and lateral sipes along the tire radial direction are identical in the pneumatic tires of the embodiment and the comparative samples 1 and 2.

A cornering performance, a braking performance and a startup accelerating performance are shown in lower areas on Table 1.

<Cornering Performance>

Sensory evaluations for accuracy and response speed of vehicle behavior while cornering were conducted by a professional driver on snow covered and ice covered test courses with a car equipped with each of the pneumatic tires (ten being the best). The larger value is indicated, the better handling response is.

Consequently, it turned out that the cornering performance on snow and ice covered roads of the pneumatic tire according to the embodiment is superior to those of the pneumatic tires according to the comparative samples 1 and 2.

<Braking Performance>

Defined as "100" is a distance from a start of braking to 0 km/h (braking distance) after 20 km/h running on snow covered and ice covered test courses with a vehicle equipped with the pneumatic tires according to the comparative sample 1. Based on this condition, braking distances of vehicles equipped with the pneumatic tires according to the embodiment and the comparative sample 2 were measured and their relative values were calculated. Note that the shorter braking distance is, the better a braking performance is.

Consequently, it turned out that the braking performance on snow covered roads of the pneumatic tire according to the embodiment is superior to those of the pneumatic tires according to the comparative samples 1 and 2. In addition, it turned out that the braking performance on ice covered roads of the pneumatic tire according to the embodiment is superior to that of the pneumatic tire according to the comparative sample 1.

<Startup Accelerating Performance>

Defined as "100" is time from speed 0 km/h to 20 km/h (acceleration time) on snow covered and ice covered test courses with a vehicle equipped with the pneumatic tires according to the comparative sample 1. Based on this condition, acceleration times of vehicles equipped with the pneumatic tires according to the embodiment and the comparative sample 2 were measured and their relative values were calculated. Note that the shorter acceleration time is, the better a startup accelerating performance is.

Consequently, it turned out that the startup accelerating performance on snow and ice covered roads of the pneumatic tire according to the embodiment is superior to those of the pneumatic tires according to the comparative samples 1 and 2.

INDUSTRIAL APPLICABILITY

According to the present invention, since the inside circumferential sipes extend straight along the tire radial direction and the outside circumferential sipes extend along the tire radial direction in zigzag patterns, stiffness reduction of the outside blocks can be restrained and thereby a handling performance, especially, a startup accelerating performance, a braking performance and a cornering performance can be improved.

The invention claimed is:

1. A pneumatic tire comprising a tread having blocks segmented by plural circumferential grooves extending along a tire circumferential direction and plural lateral grooves extending along a tread width direction, wherein
   each of the blocks has a circumferential sipe extending along the tire circumferential direction,
   inside circumferential sipes among the circumferential sipes, which are positioned inside a tire equatorial plane under being equipped onto a vehicle, extend substantially straight along an entire sipe in a tire radial direction, and
   outside circumferential sipes among the circumferential sipes, which are positioned outside the tire equatorial plane under being equipped onto a vehicle, extend along the tire radial direction in zigzag patterns.

2. The pneumatic tire according to claim 1, wherein the circumferential sipes extend along the tire circumferential direction in zigzag patterns.

3. The pneumatic tire according to claim 1, wherein lateral sipes extending along the tread width direction are provided in the blocks.

4. The pneumatic tire according to claim 3, wherein inside lateral sipes among the lateral sipes, which are positioned inside the tire equatorial plane under being equipped onto a vehicle, extend along the tire radial direction in zigzag patterns, and
   outside lateral sipes among the lateral sipes, which are positioned outside the tire equatorial plane under being equipped onto a vehicle, extend straight along the tire radial direction.

5. The pneumatic tire according to claim 4, wherein depths of the inside and outside lateral sipes are almost equal.

6. The pneumatic tire according to claim 4, wherein the number of zigzag of each circumferential sipe is fewer than the number of zigzag of each lateral sipe.

7. The pneumatic tire according to claim 3, wherein the lateral sipes extend along the tread width direction in zigzag patterns.

8. The pneumatic tire according to claim 1, wherein depths of the inside and outside circumferential sipes are almost equal.

9. The pneumatic tire according to claim 1, wherein the pneumatic tire is a pneumatic passenger car tire.

* * * * *